UNITED STATES PATENT OFFICE.

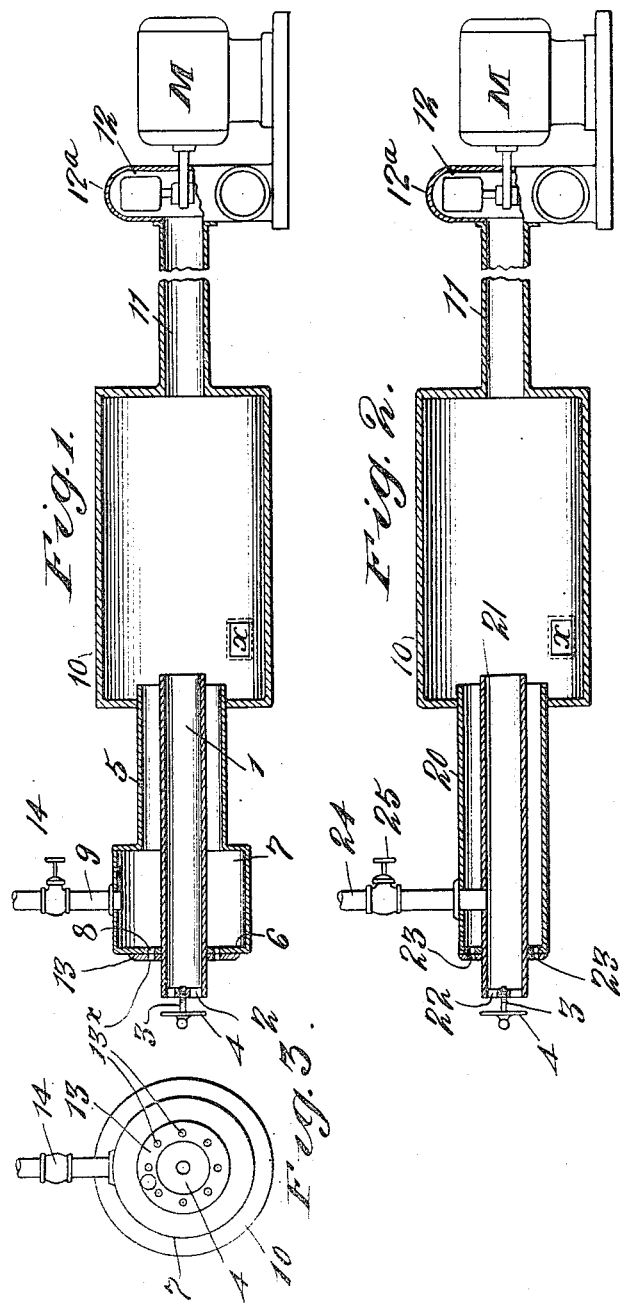

ALCORN RECTOR, OF NEW YORK, N. Y., ASSIGNOR TO RECTOR GAS LAMP COMPANY, OF NEW YORK, N. Y., A CORPORATION OF NEW YORK.

COMBUSTION APPARATUS.

1,144,783. Specification of Letters Patent. Patented June 29, 1915.

Application filed September 26, 1910, Serial No. 583,774. Renewed May 19, 1915. Serial No. 29,225.

*To all whom it may concern:*

Be it known that I, ALCORN RECTOR, citizen of the United States, residing at New York city, in the county and State of New York, temporarily residing in the city of Pittsburgh, in the county of Allegheny and State of Pennsylvania, have invented certain new and useful Improvements in Combustion Apparatus, of which the following is a specification, reference being had therein to the accompanying drawing.

This invention relates to an apparatus for combustion of any appropriate gas or gasifying fuel adapted to be burned by the present method, its object being to secure improved combustion with the production of a maximum of heat and a minimum waste of unconsumed carbonaceous products.

In burning natural combustible gas, which, because of its high hydrogen content, requires more air than artificial gas to effect combustion, tall and expensive chimneys are required, involving plant accessories that are constructed, operated and maintained at great expense, and they are so inefficient that large quantities of unconsumed carbonaceous material issue as waste from the chimneys, to the detriment of health or convenience and to the injury of buildings, etc.

While my invention is of particular applicability in removing the objections noted in connection with natural gas, my apparatus may be well employed in the burning of any combustible gas.

In the accompanying drawing, illustrating the principle of my invention and the best mode now known to me of applying that principle, Figure 1 is mainly a diagrammatic view of apparatus useful in practising my invention. This view shows one form of novel apparatus. Fig. 2 is a view similar to Fig. 1, of a modified form of apparatus. Fig. 3 is an end view of what is shown in Fig. 1.

In the drawing (Fig. 1), I show a novel form of air and gas supply apparatus, consisting of a central air tube 1 formed at its butt end with a cross-piece that is formed with a threaded hole for reception of a threaded projection 3 of the thereto-fixed cover plate 4, adjustment of which serves to regulate (if any such regulation is required) the volume of air admitted to the air tube. This air tube is inclosed by a tube 5 of larger diameter and provided with an end wall 6, through a central hole in which the air tube is passed and there fixed. An annular gas space 7 is thereby formed around the air tube, the two tubes being preferably concentric. End wall 6 is perforated at 8 for admission of atmospheric air into space 7, wherein it is mixed with a gas that is supplied to mixing chamber 7 through gas pipe 9 which communicates with chamber 7, preferably near the butt end thereof, so as to secure as thorough mixing as possible of the gas and air before such mixture reaches the fire tip. A Bunsen burner having a central air passage is thus obtained. The tip portion of the described apparatus communicates with the chamber of a casing 10 that is intended to represent any kind of structure,—heater, stove, radiator, furnace, etc., etc. The chamber is also connected, preferably by an exhaust conduit 11, with a suction fan casing (or any equivalent) 12, operable in any suitable manner first to suck air in at the butt end of the air tube simultaneously with the mixing of the air and gas in gas space 7; second to compel a central air draft to travel at speed, under a power control that is regulable at will, through the tubular volume of the mixture but out of contact with the mixture until the central air body and tubular mixture intermingle to a certain extent at the tip of the supply apparatus; third to accelerate and intensify combustion of the mixture when it is ignited at the tip of the outer tube; and fourth to carry off the products of combustion from within the casing and to remove them from the immediate vicinity of the flame rapidly and efficiently.

Because of the central swiftly moving or properly high-speed, power-controlled and regulable air draft, very perfect combustion is obtained. If desired, the air inlets or perforations 8 may be closed by the damper 13, provided with holes $13^x$, so as to cut off access of air to mixing chamber 7, in which event unmixed gas from pipe 9 may flow into chamber 7 and thence to the tip of the outer tube, for ignition and combustion. In that event, the Bunsen burner function of the supply apparatus is eliminated. Of course damper 13 and cover-plate 4 may be each adjusted to regulate and vary the admission of air. Pipe 9 is shown with a regulating valve 14.

M indicates a motor for driving the fan.

This apparatus is peculiarly advantageous in burning natural gas in that it is readily regulated to vary the volume and relative quantities of air admitted to the tubes; and in using this apparatus, the annular flame obtained on ignition of the gas at the tip of the outer tube is interiorly exposed to a high-speed air current or central draft, the speed depending on the strength of the suction.

In Fig. 2, the supply apparatus is so constructed as to reverse the relative location of the power-controlled air draft and the volume of combustible gas. In this form, the volume of combustible gas is conducted in what may be called rod form, considered as a physical object, while the unmixed air is conducted in tubular form exteriorly of the central gas volume. In this form of construction the air tube is indicated by 20, the interior gas tube by 21 and the air inlet of the Bunsen burner by 22. It is to be noted that this inlet is exterior. The gate-controlled perforations in the end wall 6 of the air tube are indicated by 23, the gas supply pipe of the Bunsen burner tube by 24, and its cut-off valve by 25.

In Figs. 1, 2 and 3, the casing or shell indicating any form of useful construction is shown with a door $x$, so that access may be had to the gas jet to light it. Any other suitable ignition device or means may, of course, be used. Casing 10 may be made of any suitable material, size or shape, whether non-translucent or non-transparent, or translucent or transparent. The contour, size and material of which the apparatus is made will depend entirely upon the uses to which the apparatus is to be put. While atmospheric air will be ordinarily sucked into union with the combustible fuel, yet, of course, any combustion-supporting gas, such as oxygen, for example, may be used in any available form in lieu of the atmospheric air or in lieu of air at other than atmospheric pressure; and any suitable fuel may be used. The casing is substantially closed against the admission of any air secondary or additional to that required for the purpose of combustion.

In all forms of the invention, as shown, the combustion chamber is provided with a door or the like $x$, for ignition purposes; but obviously any suitable kind of ignition device may be used.

Another advantage of this structure is that it makes it possible to direct, with blowpipe effect, the flames directly at and in contact with heating surfaces, particularly efficient in heaters, water boilers and many industrial uses.

I do not herein claim the method or process involved, as that forms the subject-matter of my application Serial No. 583,773, filed September 26, 1910. In this embodiment of my invention, the gaseous mixture is burned while in an exceedingly rarefied molecular condition, due to its rapid expansion when its constituents are introduced into the combustion chamber, and also burned while the combustion chamber is partially vacuumized by the suction: thus highly perfected combustion is secured. The artificial suction apparatus is operable to secure a uniform, continuous suction.

The suction fan casing $12^a$ attached to exhaust pipe 11 prevents entrance of back drafts through the fan casing into the combustion chamber when the apparatus is in operation, and serves to maintain the partially vacuumized condition of the combustion chamber. In all the forms of apparatus shown, the gas or liquid may be mixed with air before the mixture reaches the combustion point or flame.

It will be noted that in all the forms of apparatus shown, the artificial suction apparatus creates and maintains a substantial vacuum in the combustion chamber and is a substantially integral part of the apparatus as a whole; and that the connection with the atmosphere through the combustion chamber is relatively small or restricted, so that the fan in its operation greatly rarefies the content of the combustion chamber during the combustion. Moreover, the construction is such, and intended to be such, that there can be no invasion of air in large masses or of cold air into the combustion chamber, which is closed during operation, except where the mixed air and gas and another volume of air are introduced into the combustion chamber; and except where the relatively small exhaust pipe 11 extends to the casing of the suction fan. It is also observable that all the air that is admitted into the apparatus is rarefied by the action of the suction apparatus, which also rarefies the products of combustion, until the latter have passed the fan. The air is so regulable in respect to its intake that no more air than is required for purposes of combustion is wisely taken in, and therefore, there is no passing of unconsumed gas and air past the exhaust fan, as is the case in many other forms of apparatus and under many other methods of combustion. All air not required for combustion should be carefully excluded from the present apparatus, which is made nicely regulable at the air intake to accomplish this important result. In other words, prevention of back-drafts, rarefaction of the mixed gas and air and of the air taken into the apparatus, rarefaction of the combustible mixture at the place of combustion, and rarefaction of the products of combustion while they remain in the apparatus, and the provision for exclusion of all air not required for mere purposes of combustion, are material points of the present invention, and by this invention are brought for the first time into such a unitary and practical form that approximately perfect combustion is obtainable without the use of high chimneys and with a minimum loss of heat units.

What I claim is:—

1. The combination with a casing closed against secondary air invasion, means connected thereto for positively producing and maintaining a partial vacuum within the casing, means for simultaneously drawing into the casing and to a place of combustion therein a volume of combustible fuel and a volume of combustion supporting gas, means for separating the one from the other up to a place of combustion, means for removing the products of combustion from within the casing through the vacuum producer.

2. The combination with a casing closed against secondary air invasion, means connected thereto for positively producing and maintaining a partial vacuum within the casing, means for simultaneously drawing into the casing and to a place of combustion therein a volume of combustible fuel mixed with air.

3. The combination of a fuel supply tube having an air in-take with a tube for supplying combustion supporting gas, said tubes having their inner ends adjacent the one to the other and adapted to deliver their contents to a combustion chamber, means for producing and maintaining a partial vacuum in the combustion chamber, an airtight conduit leading from the vacuum producing means to the combustion chamber.

4. In a combustion apparatus, substantially air-tight combustion chamber, conduits leading thereto for conveying a regulable mixture of air and gas and a regulable supply of combustion supporting gas, a positively operated vacuum creating and maintaining apparatus, an air-tight conduit leading from the said vacuum apparatus to the combustion chamber.

5. In combination with a closed combustion chamber, means for supplying a volume of combustible fuel and a volume of combustion-supporting gas thereto, means for mixing the two volumes together at the point of combustion within the combustion chamber, a vacuum producing and maintaining apparatus hermetically connected to the combustion chamber, means for forcibly drawing the air and combustible fuel into the combustion chamber and for forcibly withdrawing the products of combustion from the combustion chamber through the vacuum producing apparatus.

6. In a combustion apparatus, a closed combustion chamber having at one side thereof a closed conduit for supplying the volume of combustible gas and a regulable volume of air to the combustion chamber and upon another side thereof a closed conduit leading to a vacuum producing and maintaining apparatus and means for forcibly discharging the products of combustion into the atmosphere through the vacuum producing apparatus.

7. In a combustion apparatus, a substantially closed combustion chamber in communication with a closed conduit for the supply of a combustible fuel, a vacuum producing and maintaining device, a closed conduit leading therefrom to the combustion chamber, said vacuum producing and maintaining device being also operable for supplying the fuel to the combustion chamber and for withdrawing the products of combustion from the said chamber.

8. In a combustion apparatus, a combustion chamber, a closed conduit in communication therewith for the supply of a combustible fuel, a vacuum producing and maintaining device, a closed conduit connected therewith to the combustion chamber, the said vacuum producing and maintaining device being operable to forcibly draw air into the chamber for mixture with the fuel and to forcibly withdraw the products of combustion from the chamber.

9. In a combustion apparatus, the combination of a vacuum producing and maintaining device with a combustion chamber, means for the admission of gas and air thereto, means for forcibly drawing the air necessary for combustion into said chamber through said admission means.

10. In a combustion apparatus, the combination of a combustion chamber substantially closed from the atmosphere, means for creating an artificial and forcible draft to supply gas and air sufficient for combustion to the combustion chamber.

In testimony whereof I have affixed my signature in presence of two witnesses.

ALCORN RECTOR.

Witnesses:
 WALTER YATES,
 CHAS. F. RANDOLPH.